(12) United States Patent
Luan et al.

(10) Patent No.: US 10,089,660 B2
(45) Date of Patent: Oct. 2, 2018

(54) ONLINE REVIEW ASSESSMENT USING MULTIPLE SOURCES

(71) Applicant: STC.UNM, Albuquerque, NM (US)

(72) Inventors: Shuang Luan, Albuquerque, NM (US); Abdullah Mueen, Albuquerque, NM (US); Michalis Faloutsos, Riverside, CA (US); Amanda J. Minnich, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 410 days.

(21) Appl. No.: 14/849,227

(22) Filed: Sep. 9, 2015

(65) Prior Publication Data
US 2016/0070709 A1    Mar. 10, 2016

Related U.S. Application Data

(60) Provisional application No. 62/110,183, filed on Jan. 30, 2015, provisional application No. 62/048,018, filed on Sep. 9, 2014.

(51) Int. Cl.
*G06Q 30/02* (2012.01)

(52) U.S. Cl.
CPC .................. *G06Q 30/0282* (2013.01)

(58) Field of Classification Search
CPC .................................. G06Q 30/0282
USPC ........................................ 707/728
See application file for complete search history.

(56) References Cited

U.S. PATENT DOCUMENTS

| | | | | |
|---|---|---|---|---|
| 9,697,490 B1 * | 7/2017 | Piper | ................ | G06Q 30/0282 |
| 9,846,896 B2 * | 12/2017 | Shah | ................ | G06Q 30/0282 |
| 2005/0034071 A1 * | 2/2005 | Musgrove | ............. | G06F 17/277 |
| | | | | 715/256 |
| 2005/0223002 A1 * | 10/2005 | Agarwal | ........... | G06F 17/30864 |
| 2007/0143128 A1 * | 6/2007 | Tokarev | ................ | G06Q 10/10 |
| | | | | 705/347 |
| 2008/0249764 A1 | 10/2008 | Huang et al. | | |
| 2009/0063247 A1 * | 3/2009 | Burgess | ................ | G06Q 30/02 |
| | | | | 705/7.34 |
| 2009/0144272 A1 * | 6/2009 | Adarsh | ............. | G06F 17/30864 |
| 2009/0276233 A1 * | 11/2009 | Brimhall | ................ | G06Q 30/02 |
| | | | | 705/38 |

(Continued)

OTHER PUBLICATIONS

Jindal, Nitin et al., Opinion Spam and Analysis, WSDM'08, Feb. 11-12, 2008, p. 219-229.

(Continued)

*Primary Examiner* — Evan S Aspinwall
(74) *Attorney, Agent, or Firm* — Valauskas Corder LLC

(57) ABSTRACT

Multiple sources of reviews for the same product or service (e.g. hotels, restaurants, clinics, hair saloon, etc.) are utilized to provide a trustworthiness score. Such a score can clearly identify hotels with evidence of review manipulation, omission and fakery and provide the user with a comprehensive understanding of the reviews of a product or establishment. Three types of information are used in computing the score: spatial, temporal and network or graph-based. The information is blended to produce a representative set of features that can reliably produce the trustworthiness score. The invention is self-adapting to new reviews and sites. The invention also includes a validation mechanism by crowdsourcing and fake review generation to ensure reliability and trustworthiness of the scoring.

20 Claims, 16 Drawing Sheets

(56) References Cited

U.S. PATENT DOCUMENTS

| | | | | |
|---|---|---|---|---|
| 2009/0319342 | A1* | 12/2009 | Shilman | G06F 17/30864 |
| | | | | 705/7.41 |
| 2012/0072384 | A1* | 3/2012 | Schreiner | G06Q 30/02 |
| | | | | 706/45 |
| 2012/0254158 | A1* | 10/2012 | He | G06F 17/30489 |
| | | | | 707/722 |
| 2012/0265755 | A1* | 10/2012 | McNally | G06Q 10/063 |
| | | | | 707/723 |
| 2012/0316990 | A1* | 12/2012 | Fallows | G06Q 30/02 |
| | | | | 705/26.35 |
| 2013/0198183 | A1* | 8/2013 | Clendinning | G06Q 30/02 |
| | | | | 707/736 |
| 2014/0279394 | A1* | 9/2014 | Stibel | G06Q 30/0282 |
| | | | | 705/38 |
| 2015/0161686 | A1* | 6/2015 | Williams | G06Q 30/0282 |
| | | | | 705/347 |
| 2015/0370801 | A1* | 12/2015 | Shah | G06Q 30/0282 |
| | | | | 707/728 |
| 2017/0111385 | A1* | 4/2017 | Madhu | H04L 63/1433 |

OTHER PUBLICATIONS

Jindal, Nitin et al., Analyzing and Detecting Review Spam, IEEE Computer Society, 2007, p. 547-552.
Lim, Ee-Peng, Detecting Product Review Spammers Using Rating Behaviors, CIKM'10, Oct. 26-30, 2010, p. 939-948./'/.
Mukherjee, Arjun et al., Spotting Fake Reviewer Groups in Consumer Reviews, WWW'12, Apr. 16-20, 2012, p. 191-200.
Wang, Guan et al., Review Graph Based Online Store Review Spammer Detection, IEEE Computer Society, 2011, p. 1242-1247.

* cited by examiner

ONLINE REVIEW ASSESSMENT USING MULTIPLE SOURCES

CROSS-REFERENCE TO RELATED APPLICATIONS

This application claims priority to U.S. Provisional Patent Application No. 62/048,018 filed Sep. 9, 2014, and U.S. Provisional Patent Application No. 62/110,183 filed Jan. 30, 2015.

FIELD OF THE INVENTION

The invention relates generally to consumer reviews of product and services. More specifically, the invention merges, compares, and evaluates reviews from multiple hosting sites to compute a trustworthiness score indicating which hosting sites and providers promote untruthful reviews directed to particular goods and/or services.

BACKGROUND

A review is a critical evaluation of a publication (e.g., books, movies, etc.), product (e.g., automobiles, electronics, kitchen ware, etc.), service (e.g., hotels, restaurants, etc.), or company, or an event or performance (e.g., concerts, theatrical shows, etc.). In addition to a critical evaluation, the review's author may choose to give a quantitative rating (e.g., 3 stars out of 5) to indicate the relative merits of the thing being reviewed as compared to its peers. Websites such as Google, Amazon, TripAdvisor, etc. provide the best platforms for people to share their critical reviews.

There are several entities involved in a review hosting system. The reviewers who review a hotel, the users who read reviews and make purchase decision, the product or service that are reviewed and the hosting sites that hosts those reviews. Everyone's interest is best served when there reviews are fair and truthful.

Online reviews provide an unprecedented mechanism for customers to inform potential customers. On the other hand, reviews can suffer from: (a) relevance, as the needs and expectations of customers varies, and (b) fraudulent behavior from "biased" reviewers or the product providers themselves. As a result, it is not easy for customers to interpret and use such reviews. One often relies either on the overall or cumulative rating or laboriously goes through many reviews to identify relevance and trustworthiness.

Most review sites give visitors a cumulative (e.g., average star rating), and sometimes categorized (e.g., reviews of different aspects of a product or service. The problem with cumulative rating is that the average may not be a true reflection of the opinions of the reviewers. Furthermore, online reviews may be burdensome when the product or service appears on more than one review site.

Currently, the existence of multiple review sites can add to the confusion of the user. Each of these sites may give a different view of a product or service, and it can be difficult for the consumer to know whom to trust.

Previous efforts have focused on identifying fraudulent reviews and reviewers using a diverse set of review data in both supervised and unsupervised manners, but only consider a single review hosting site. Certain methodologies detect fraud by exploiting network effects and clique structures among reviewers and products to identify fraud. Text-based detection of fraud is studied to spot a fake review without having the context of the reviewer and reviewed product. Temporal patterns, such as bursts, have also been identified as fraudulent behavior. Various other types of methodologies detect fraud using unusual behavioral footprints, unusual distributional footprints, unexpected rules and unusual rating behaviors.

Thus, there is a need for leveraging reviews from multiple review sites to make more informed decisions and detect fraud. The invention satisfies this need.

SUMMARY OF THE INVENTION

The invention uses multiple review hosting sites to compute and output a score indicating which hosting sites promote untruthful reviews. Specifically, the invention directs its efforts to identify providers of goods and services that promote fraudulent reviews as well as hosting sites that promote fraudulent reviews. A provider may be any person or entity that offers goods and/or services, such as those relating to hotels, restaurants, and automobiles. A hosting site may be any website that offers reviews of products or services as those found on TripAdvisor.com, Hotels.com, Booking.com.

Fraud or fraudulent refers to manipulation, omission or fakery. Fraudulent reviews are those that are fake or untruthful, such as those from "biased" reviewers or the product providers themselves.

The invention is directed to a systematic methodology to analyze, compare, and synthesize reviews from multiple review hosting sites with a key contribution directed to matching identities of providers across different sites. As examples, hosting sites may be those currently known as TripAdvisor.com, Hotels.com, Booking.com. In particular, the invention reduces or eliminates disambiguation of providers between sites. For example, differences may be as simple as Street versus St. Since a hotel name may not be unique the invention according to one embodiment uses a geodesic distance to disambiguate between hotels.

The invention advantageously introduces and evaluates features that capture cross-site discrepancies effectively in order to compute a score that assesses the trustworthiness of a group of reviews.

The invention is fundamentally different from current known methods that evaluate if a review is fake or untruthful. It is difficult to achieve high recall in identifying review fraud—mostly because of the dynamics of the fraudsters and the lack of labeled data. Even assuming high recall can be achieved in the prevention of fake reviews from being shown to the readers, the providers and hosting sites that promote fraudsters are not penalized and users are not notified of which providers are trying to lie to their customers. Therefore, the invention is directed to evaluation of providers and review hosting sites to find which ones promote untruthful reviews, and to produce a trustworthiness score to present to the user indicating the level of untruthfulness, or suspiciousness. Such scores are more beneficial to the review readers as they can use these scores in reaching their ultimate decision regarding the good or service.

One advantage is that the invention provides a systematic approach to cross-site review evaluation of reviewer-centric, provider-centric (i.e., hotel-centric), and review-centric features. Each of the features capture temporal, spatial, contextual and graph-based or graphical characteristics. This provides a multi-faceted view of the reviewing process of a product or service. The trust-worthiness of the overall review in one site is evaluated using cross-site features leveraging information from the other sites. According to the invention, using cross-site features increases the number of suspicious providers found.

Another advantage is that the invention provides an extensive study of cross-site review differences. This involves an automated method to match provider identities on different sites. In an application of the invention, this automated method is performed with 93% accuracy.

Another advantage of the invention is the improvement in detecting suspicious providers. In an application of the invention, seven times more suspicious providers were found across multiple hosting sites than summing those found for each site in isolation.

Another advantage of the invention is a cross-site scoring system that assesses (a) temporal, spatial, contextual, and graph-based characteristics from each site, and (b) cross-site features across the sites. It is conceivable that the invention may be used to (a) enable the site owner to detect misbehaving providers, and (b) by the end user. As an example, an administrator can apply the trustworthiness score to the data from its hosting site alone or to data from other sites.

The trustworthiness score may assist a user in selecting a provider of goods and services more likely to have non-altered scores. In other words, the user can be more confident that a rating of say 3.5 stars is the true reflection of unbiased customers. Trustworthiness could be used again when a single site is available, but its power lies in its ability to combine reviews from multiple sites.

Turning to an embodiment in which the provider is a hotel for exemplary purposes, the trustworthiness score may be used to re-rank hotels, by altering the the rate of the hotel, and as a filtering mechanism, in which hotels with an unreliable trustworthiness score are not even shown to the user.

There are many ways that to modify the rating of a hotel based on the trustworthiness score. The full input is the rating from each site, the number of reviews per site, the trustworthiness of each site, and the trustworthiness across all sites.

In addition, filtering may be accomplished using trustworthiness in which the cut-off threshold of trustworthiness only needs to be found which forms the cut-off point for hotels with a score less than the threshold. The filtering threshold needs to balance the ability to remove suspicious hotels with its false positive rate, which would reduce the overall choice for the end user.

The invention and its attributes and advantages may be further understood and appreciated with reference to the detailed description below of one contemplated embodiment, taken in conjunction with the accompanying drawings.

DESCRIPTION OF THE DRAWING

The accompanying drawings, which are incorporated in and constitute a part of this specification, illustrate an implementation of the invention and, together with the description, serve to explain the advantages and principles of the invention.

DETAILED DESCRIPTION OF THE INVENTION

Figure 1:
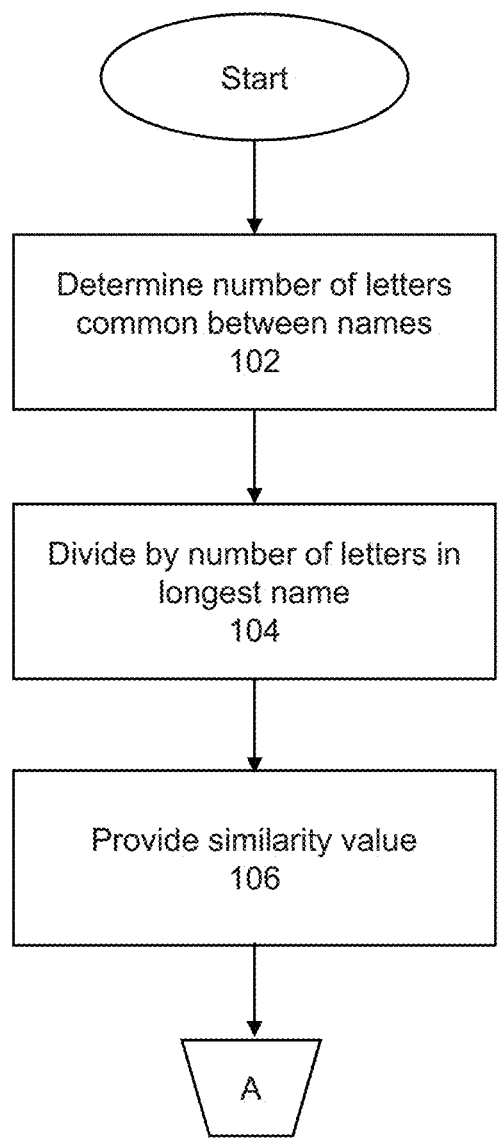
FIG. 1 is a flow chart directed to steps to disambiguate providers using name comparison.

The invention is described in reference to hotel services for exemplary purposes only. It is contemplated the invention is applicable to assessment of any type of online review. In particular, the invention uses hotel reviews for a combination of reasons. First, the hospitality industry exhibits relative stability and consistency. Proximity to the beach does not change, unlike product properties which quickly lose their attractiveness, let alone that the products themselves may be replaced altogether by newer models. Second, hotel properties provide some structure and ubiquitousness. Hotels are consistently evaluated on a relatively limited number of factors (cleanliness, service, location, noise, comfort) as opposed to electronic goods—cameras, televisions—which can vary significantly depending on the interests and intent of the user.

Review sites or hosting sites that review a set of partially overlapping providers are used. Given online reviews typically include a rating, comments, time of review and possibly a reviewer-id, a trustworthiness score for the reviews of a provider that take into consideration the reviews from each site is provided.

The term "suspicious" or "suspiciousness" is used to designate reviewers or providers that appear fraudulent (e.g., manipulation, omission or fakery). Here it should be noted that the invention provides a core to assess trustworthiness of the reviews and not the relevance of reviews for a particular user such as whether or not a hotel is a pet-friendly.

In an exemplary embodiment, the invention involves use more than 15M reviews from more than 3.5M users spanning three travel sites: TripAdvisor, Hotels.com, Booking.com spanning five years for each site.

These sites—TripAdvisor.com, Hotels.com, Booking.com—were crawled to collect certain information directed to hotel reviews including: (1) number of reviews, (2) number of hotels, (3) number of unique usernames, (4) average number of reviews, (5) average rating, (6) count or percent empty reviews, (7) date range, (8) geographic range (domestic, international, United States, Europe, etc.). For each review, the following is collected: (1) text, (2) reviewer name, (3) date-time and (4) reviewer rating.

In order to account for location disambiguation, the address is collected for each hotel. The most important challenge in location disambiguation is that hotel names are not unique. Therefore, a full name and address is used to uniquely identify a hotel.

Unfortunately, addresses are also not standard across hosting sites, and the differences between sites are seemingly random. As examples, differences can be as simple as Street versus St. versus St or as complex as Hotel Atlantico Buzios Convention & Resort—Estrada da Usina, s/n, Humaita, Buzios, CEP 28950-000 and Hotel Atlantico Buzios Convention and Resort, strada da Usina 294Morro do Humait, Buzios, RJ, 28950-000, Brazil.

For international addresses, words can be in different orders, names can be formatted differently, country names can be excluded, and numbers can be morphed. Addresses can even use waypoints as reference, such as 1000 Yang Gao Road N Pudong Near Pilot Free Trade Zone Gate 3, which are not standard across websites.

Even U.S. addresses, which one might assume follow a standard format, are not immune. For example: Hilton New Orleans Riverside, Two Poydras Street, New Orleans Central Business District, New Orleans, La. 70130 and Hilton New Orleans Riverside, 2 Poydras St, New Orleans, La. 70130, United States. Clearly these two addresses are describing the same hotel, but their differences are non-trivial, e.g., the use of "Two" versus "2" and the inclusion of "New Orleans Central Business District". Another domestic example: Mauna Kea Beach Hotel, 62-100 Mauna Kea Beach Drive, Waikoloa, Hi. 96743 and Mauna Kea Beach Hotel, 62-100 Mauna Kea Beach Dr, Kamuela, Hi., 96743 United States. These two addresses have every field in common but one—one city is listed as Waikoloa and the other as Kamuela.

A combination of hotel name analysis and geodesic distance is used to disambiguate hotels. Geodesic distance ensures that the addresses are located in the same place, despite differences in formatting, and name comparison makes sure the hotels' names are similar enough to likely refer to the same provider.

Figure 2:
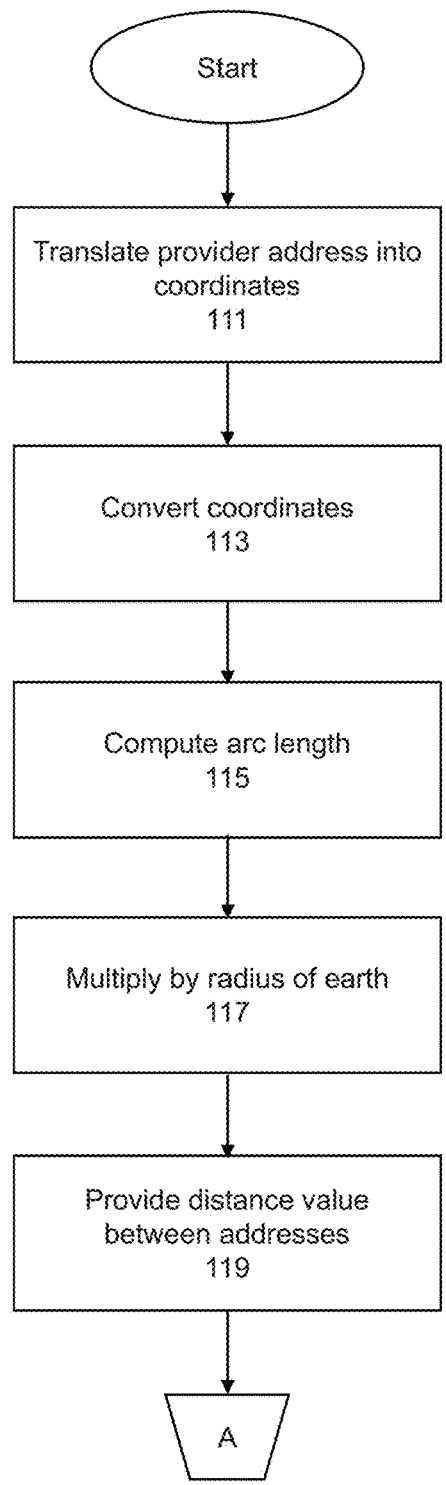
FIG. 2 is a flow chart directed to steps to disambiguate providers using geodesic distance.
Figure 3:
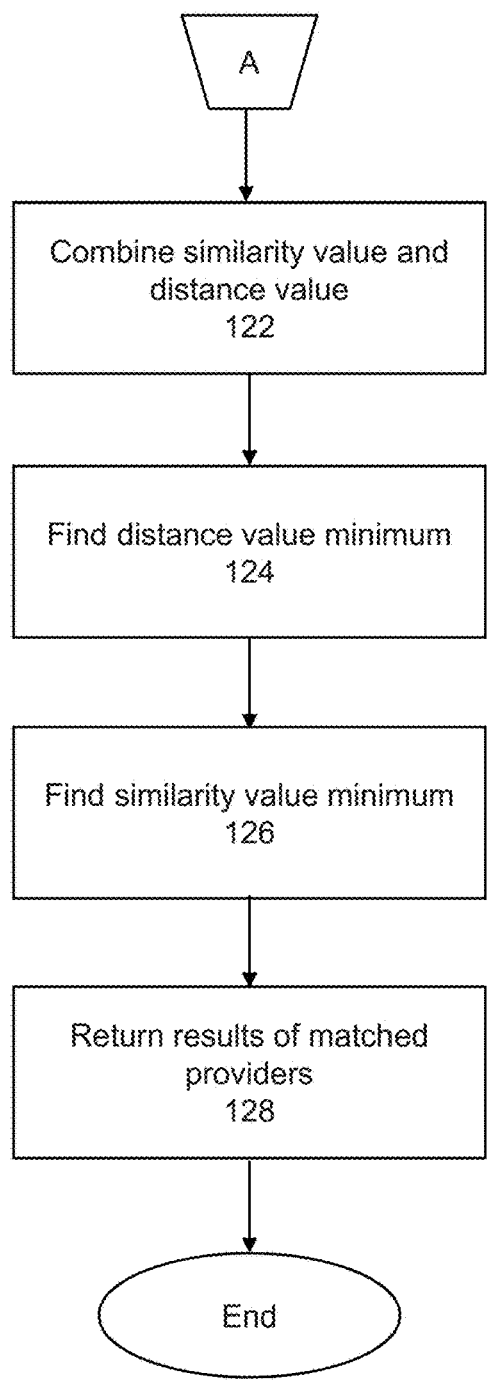
FIG. 3 is a flow chart directed to steps to disambiguate providers using name comparison and geodesic distance.

FIG. 1, FIG. 2, FIG. 3 are directed to steps to disambiguate providers according to the invention. In particular, FIG. 1 is directed to steps that compare provider names using a comparison of the number of letters in common referred to as the similarity value. As shown in FIG. 1, at step 102 the number of letters of each provider is reviewed and a number of letters common between the provider names is determined. At step 104, the number of common letters is divided by the number of letters in the longest name in order to provide the similarity value at step 106. This value is faster to compute than to edit distance and succeeds in the face of small spelling differences or omitted words. In addition, the similarity value on its own has very high precision but low recall such that when combined with geodesic distance the matching requirement for good results may be loosened.

FIG. 2 is directed to step that compare the physical location of the providers using geocoding. As shown by step 111, hotel addresses are translated into latitude and longitude coordinates using, for example, the Google Geocoding API that works well with strangely formatted addresses, both domestic and international. A cluster of computers are used to speed up the coordinate generation process since there is a limit on the number of requests per day. At step 113, the latitude and longitude coordinates are converted to spherical coordinates in radians. The arc length is then computed at step 115. This value is then multiplied by the radius of earth in miles at step 117. At step 119, the distance value in miles between the two addresses is provided.

As shown in FIG. 3, the similarity value and distance value are combined at step 122. By combining geodesic distance with a distance measure of the provider names, efficient, high-precision matching is obtained. A distance value minimum is found at step 124 and a similarity value minimum is found at step 126. To find the ideal distance maximum and similarity minimum, distances from 90 miles to 0 miles and similarities from 0.1 to 0.9 are explored. The results of matched providers are returned at step 128. According to a particular embodiment, sampling 30 hotels at each parameter combination finds a local maximum in precision at a geodesic distance maximum of 1 mile and a name similarity minimum of 0.66. Using these constraints, 13,100 total matches are found: 848 hotels were matched across all three sites, 1007 between Booking.com and Hotels.com, 655 between Booking.com and TripAdvisor.com, and 10,590 between Hotels.com and TripAdvisor.com.

After the providers are matched across sites, they are joined together for evaluation of reviewer-centric, provider-centric, and review-centric features. Each feature may be based on one or more temporal, spatial, contextual and graph-based characteristics as described more fully below.

Reviewer-centric features are based on individual sites versus across all sites. Reviewer-centric features capture scenarios involving inconsistent and unlikely reviews using spatial, temporal, contextual and graph-based characteristics.

Spatial characteristics that are inconsistent identify a suspicious user. We find a user named "AmishBoy" who reviewed 34 hotels in Amish Country located in Lancaster, Pa. over 5 years. Lancaster County spans only 984 square miles, meaning that many of the hotels this user reviewed are right next door to each other. He gave 32 out of these 34 hotels 4 or 5 star ratings, which means he was pleased with his stay. Why then would he continually switch to new hotels? Even if he is simply visiting the area for business or pleasure every couple of months, his pattern of continually switching to new hotels is suspicious. Whether innocent or not, the reviews of this user should be discounted on the grounds that he does not represent a "typical" traveler visiting this area.

Figure 4:
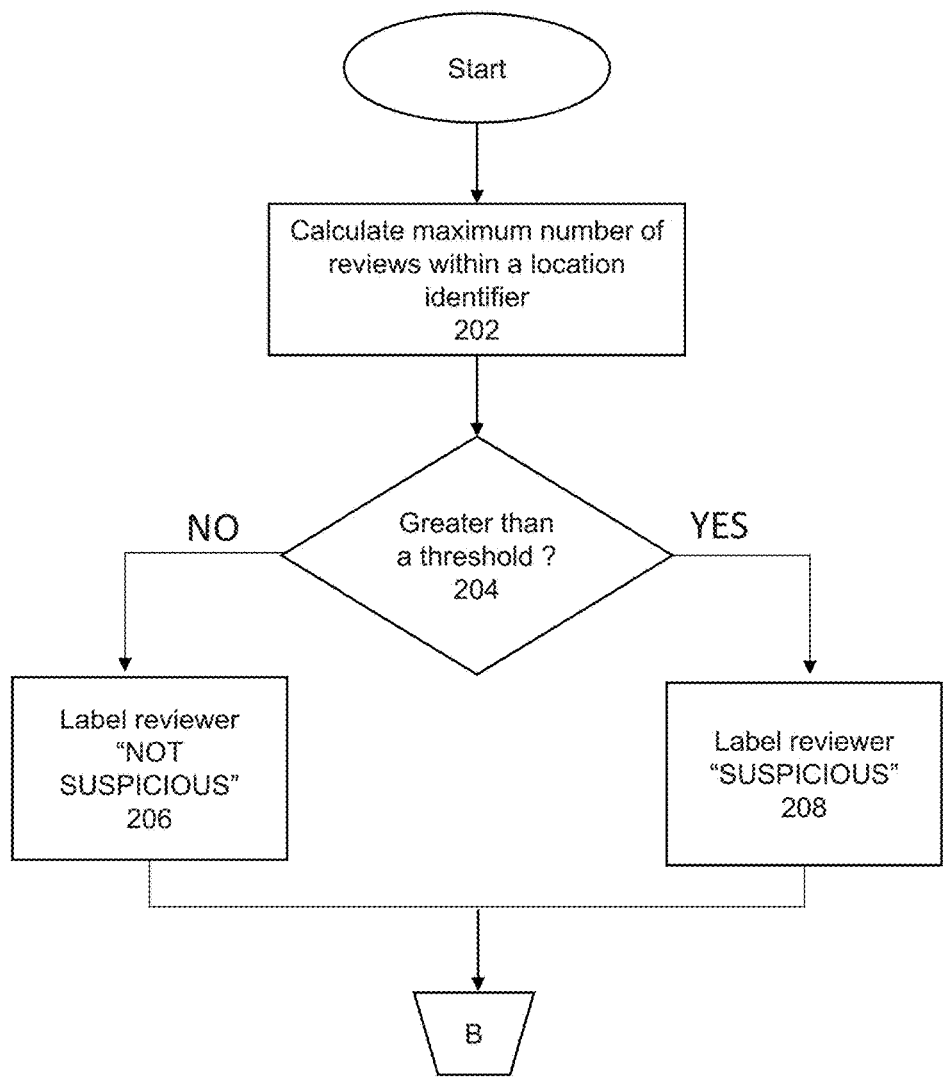
FIG. 4 is a flow chart directed to steps to identify spatial inconsistent characteristics of reviewer-centric features.

The invention identifies if a user has such a bias to a specific location and accumulates the contributions of such reviewers to every hotel. FIG. 4 is a flow chart directed to steps to identify spatial inconsistent characteristics of reviewer-centric features. Spatial inconsistent characteristics are determined by calculating the maximum number of reviews a reviewer made according to a location identifier as shown at step 202. A location identifier according to one embodiment of the invention is a specific zip-code, but others are contemplated such as county, state, city, etc. If this value is less than a threshold—for example, 5—shown at step 204, the reviewer is marked as a "not suspicious" at step 208. If the value is greater than the threshold at step 204, the reviewer is labeled "suspicious" at step 208.

To propagate the feature up to the provider level, the number of reviews is summed for each provider coming from suspicious users. Thus, if a hotel has many reviewers who have such spatial preference, it strongly suggests potential review fraud by the hotel.

Temporal characteristics that are inconsistent identify suspicious activity, for example, a reviewer writing many reviews on the same day. Typically a traveler may review a set of businesses after he comes back from a trip. However, the frequency of such trips and the spatial distribution of the businesses can provide valuable insights such as those related to a user that reviewed 25 businesses on the same day which are located across 15 states. Additionally, 21 of these reviews are "first time" reviews for the respective hotels. The reviews all describe visit dates within the same range—May 2005 through January 2006—and all of the reviews have the words "great" and "good" in the titles. Furthermore, many sentences in the review titles and text are repeated verbatim, for example "cleanliness seems to be a high priority at this hotel and the rooms are in like new condition" or "this hotel lives up to its high standards of quality".

The user has only reviewed 3 hotels in the last eight years after this burst, all on the same day in 2007. Putting these pieces of evidence together, it is clear that this user is likely a spam account.

Figure 5:
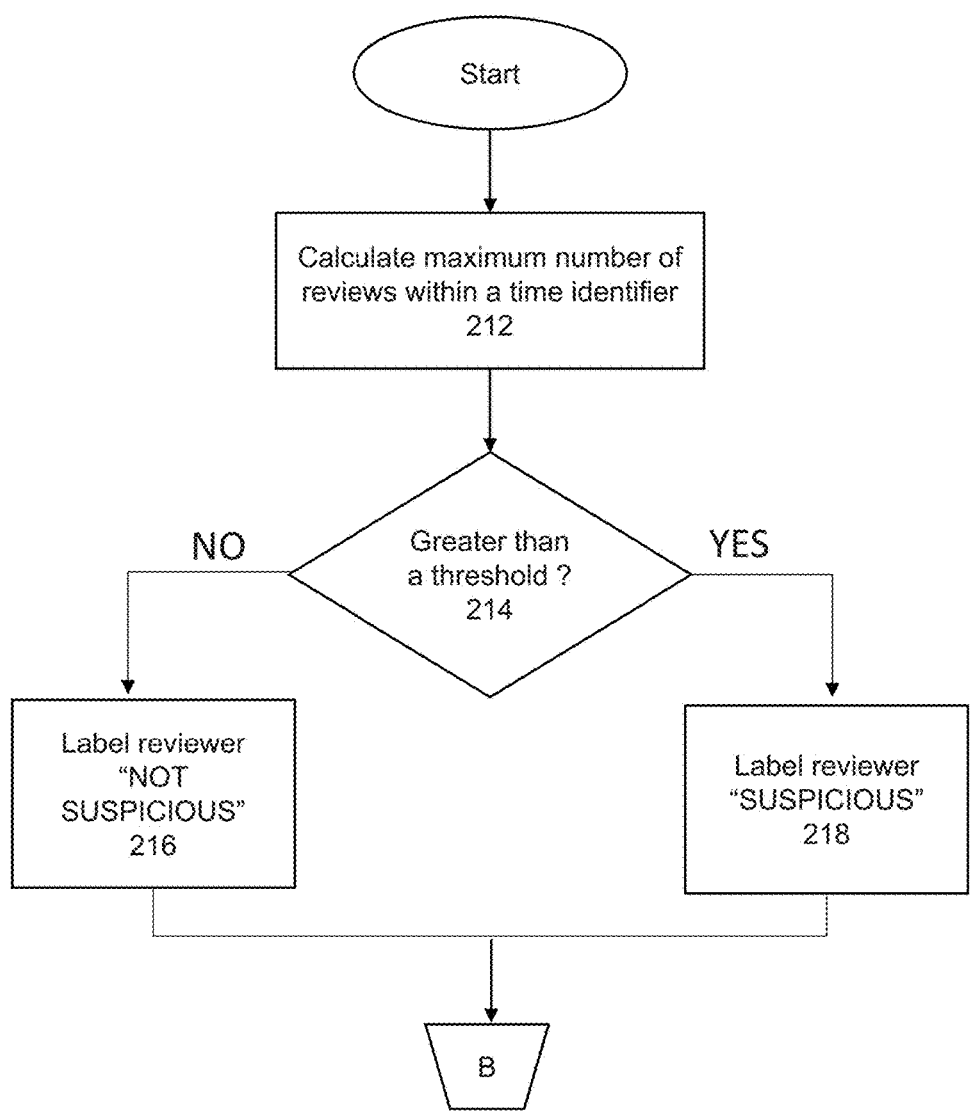
FIG. 5 is a flow chart directed to steps to identify temporal inconsistent characteristics of reviewer-centric features.

Singleton bursts have been identified as potential indicator of fraud. The above example suggests non-singleton bursts can show evidence of spamming users as well. If a hotel has a large number of such reviewers, it likely has manipulated its reviews. FIG. 5 is a flow chart directed to steps to identify temporal inconsistent characteristics of reviewer-centric features. To determine a temporal inconsistent characteristic, the maximum number of reviews a reviewer left within a time identifier—given day, month, year, etc.—is computed at step 212. If this value is less than a threshold, typically 3, as shown at step 214 that user is marked as "not suspicious" as shown at step 216. If this value is greater than the threshold at step 214, the reviewer is labeled as "suspicious" at step 218.

To propagate the feature up to the provider level, the number of reviews is summed for each provider coming from suspicious users. Thus, if a hotel has many reviewers who have such spatial preference, it strongly suggests potential review fraud by the hotel.

Graphical characteristics that are inconsistent identify suspicious reviewers. For example, bipartite cliques in user-store graphs can identify groups of reviewers that boost a set of service retailers by doing a number of small transactions in the form of positive reviews. The invention captures information about the cliques a reviewer participates in that may point to an abnormal pattern in reviews.

Figure 6:
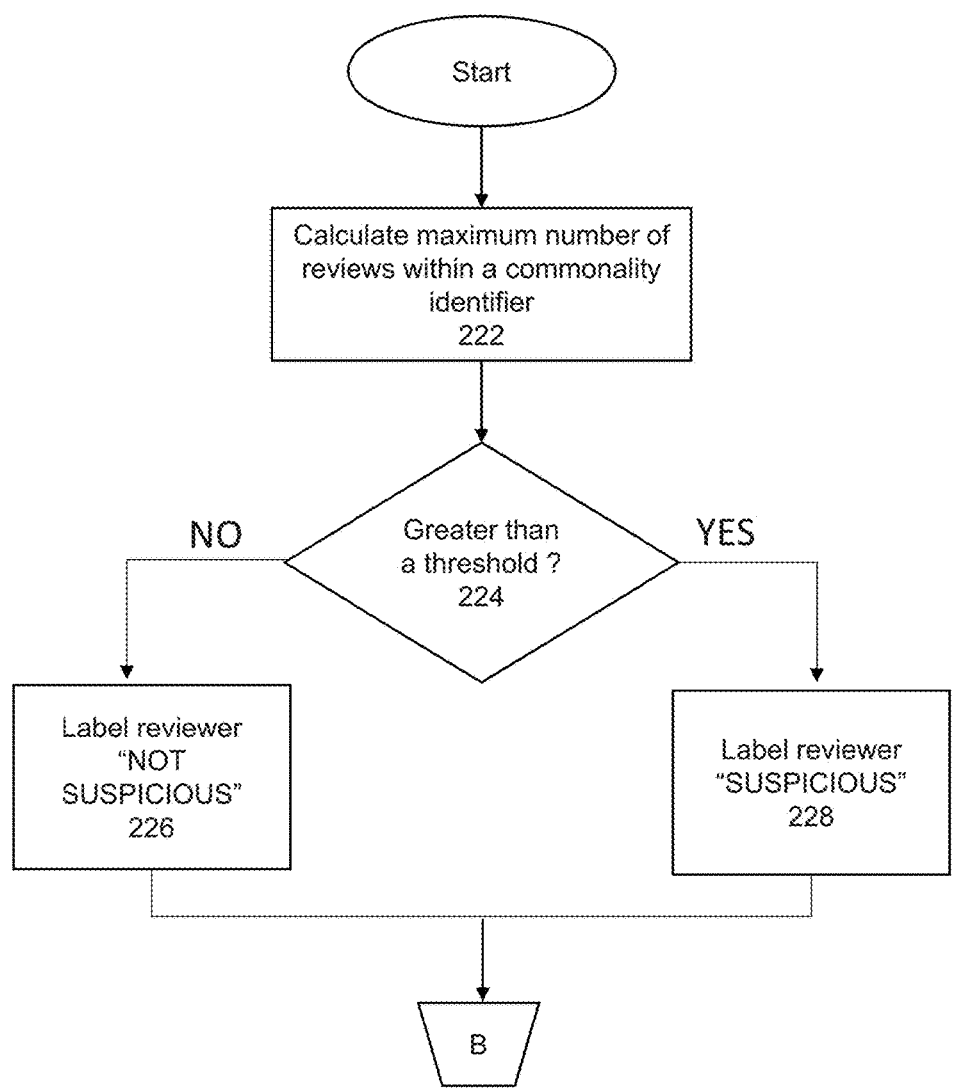
FIG. 6 is a flow chart directed to steps to identify graphical inconsistent characteristics of reviewer-centric features.

FIG. 6 is a flow chart directed to steps to identify graphical inconsistent characteristics of reviewer-centric features. As shown at step 222, the maximum number of providers a user has reviewed in common with any other user is calculated based on commonality identifiers such as the number of hotels reviewed and dates for each review as well as the clique size. As an example, one embodiment of the invention limits cliques to a size of two. If the maximum number of providers is less than a threshold as shown at step 224 that user is marked as "not suspicious" as shown at step 226. If this value is greater than the threshold at step 224, the reviewer is labeled as "suspicious" at step 228.

As an example, two users who have reviewed over 95% of the hotels in common on nearly the same dates, usually off by one day. Upon re-searching the reviewers further it is discovered that they are married substantiating that finding anomalous behavior by identifying bipartite cliques is successful. Another example is two users from Germany, who have reviewed 117 of the same restaurants, hotels, or landmarks all over the world in the past 5 years out of 189 and 186, respectively. Furthermore, they each are "first time" reviews (i.e., they were one of the first five reviewers of that location in their native language) for 136 and 144 locations. They also have surprising synchronicity in both the commonality identifiers (1) review dates and (2) stay dates for the hotels they have in common indicating that these accounts may be held by the same person—behavior of a paid spammer.

Provider-centric features are based on individual sites in addition to across all sites. Provider-centric features capture scenarios involving inconsistent and unlikely reviews using temporal characteristics.

Temporal characteristics such as bursts and oscillations may identify suspicious providers, such as hotels according one embodiment of the invention. For example, bursts and oscillations such as bursts of singleton reviews with an increase in the average ratings are considered inconsistencies. Typically such behavior is prevalent in the early years of the inception of a hotel in the hosting site.

Figure 7:
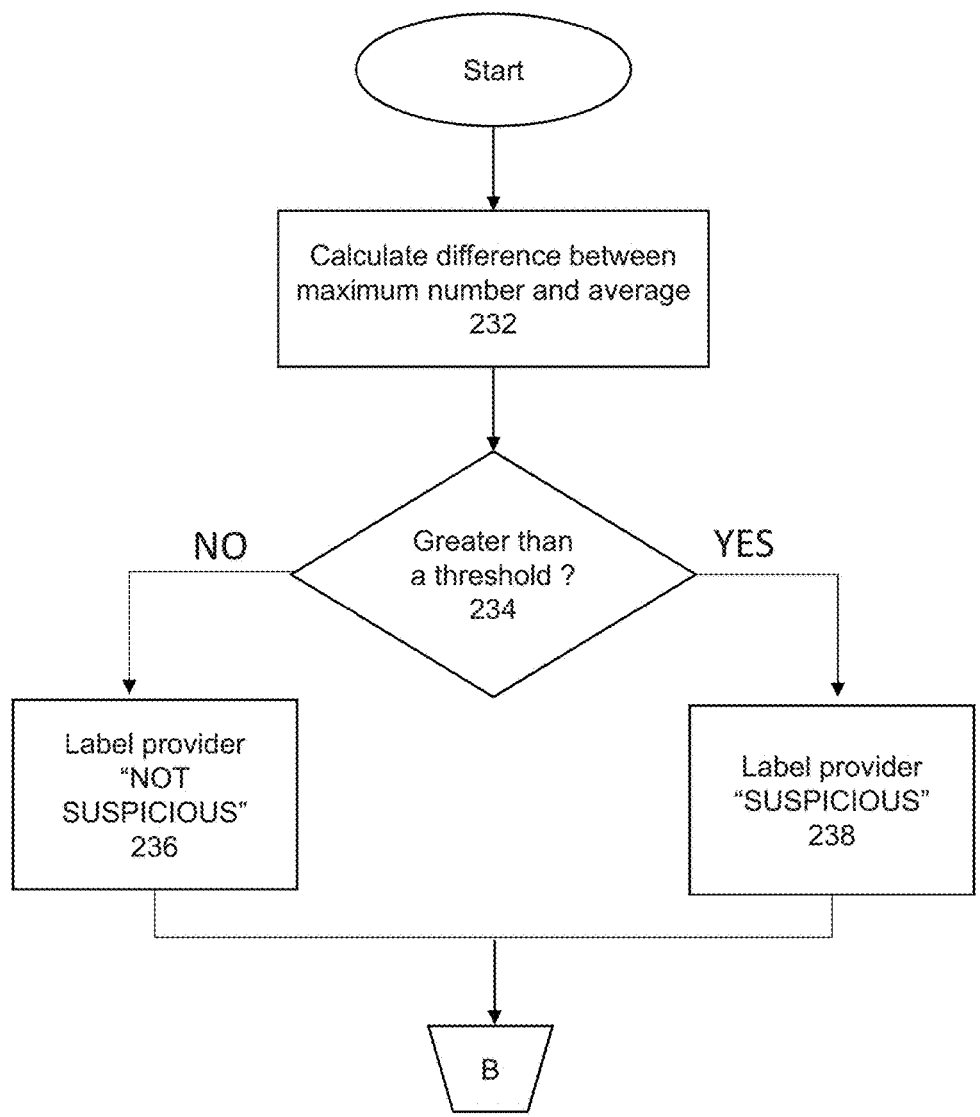
FIG. 7 is a flow chart directed to steps to identify temporal inconsistent characteristics of provider-centric features.

FIG. 7 is a flow chart directed to steps to identify temporal inconsistent characteristics of provider-centric features directed to bursts. Bursts are calculated by taking the difference between maximum number of reviews in a day and average number of reviews in a day for each hotel provider at step 232. If this value is less than a threshold as shown at step 234 that provider is marked as "not suspicious" as shown at step 236. If this value is greater than the threshold at step 234, the provider is labeled as "suspicious" at step 238.

Figure 8:
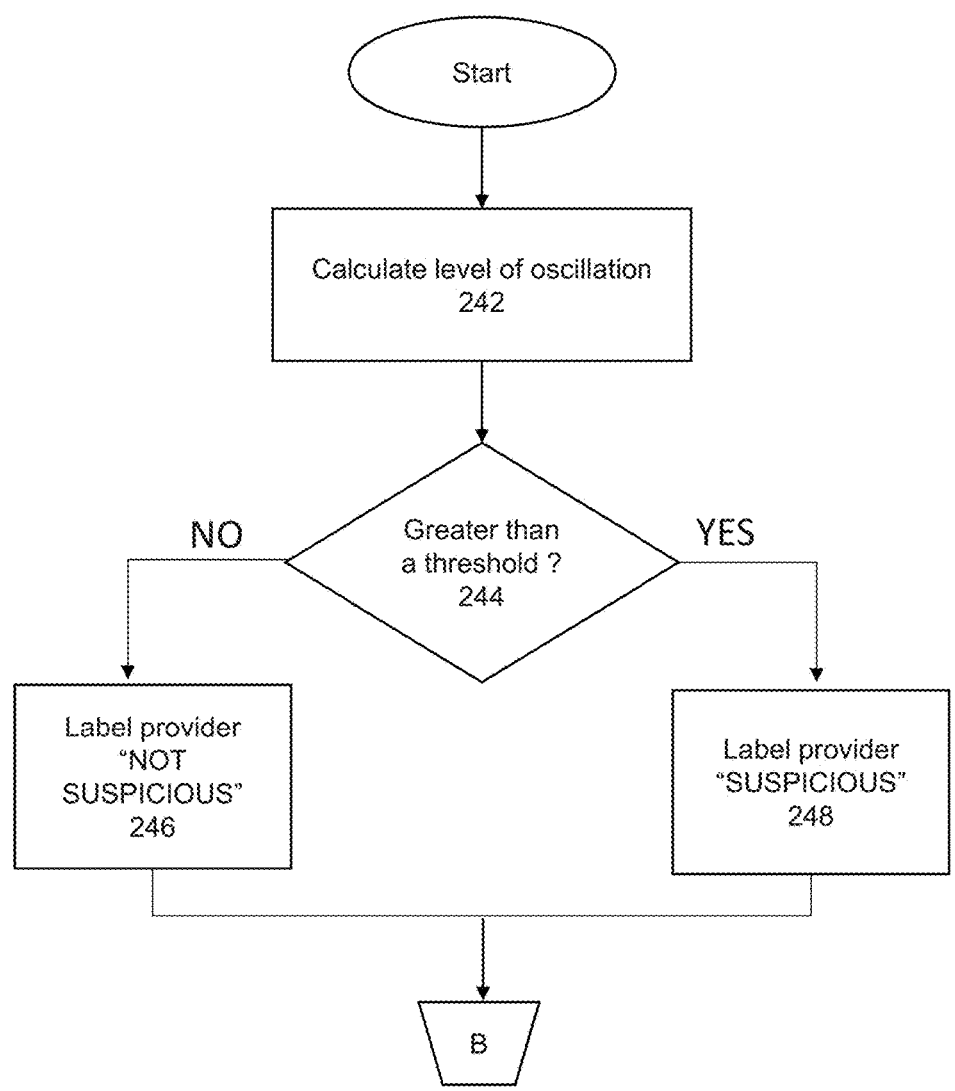
FIG. 8 is a flow chart directed to steps to identify temporal inconsistent characteristics of provider-centric features.

In addition to bursts, oscillation in ratings that are targeted to keep a high rating at the top of the "new-to-old" sorted list is a temporal inconsistency. According to one embodiment, two features are used characterize oscillation: (1) the number of times a 5 star review was immediately followed by a 1 star review for each provider, and (2) the number of times a 1 star review was immediately followed by a 5 star review for each hotel provider. Summing these feature values captures the level of oscillation of ratings for a given hotel as shown at step 242 of FIG. 8. If this level is less than a threshold as shown at step 244 that provider is marked as "not suspicious" as shown at step 246. If this level is greater than the threshold at step 244, the provider is labeled as "suspicious" at step 248.

Temporal correlation between a number of ratings of a hotel in different sites is a valuable indicator of consistent customer satisfaction. Commonly, a hotel should have very similar behavior across sites in terms of number of ratings. For example, any hotel in Myrtle Beach, S.C. shows a high number of ratings per day in summer, decreasing in the winter. This is consistent with a number of occupants at hotels in Myrtle Beach, S.C. being less in the winter months than the summer months—this makes sense since the number of ratings per day follows the average occupants of the hotel and such behavior is consistent across sites.

In one example, two or more hotel providers and the number of ratings per day are observed and shown that both have summer peaks across sites. However, one hotel has dense summer ratings on one site, but no significant peak/density on another hosting site. Such discrepancy in temporal behavior can exist for several reasons, each of which is worth considering when it comes to evaluating hotels. The hotel might have received more poor ratings in the summer which were omitted by the hosting site, or the hotel could have sponsored some winter reviews. There can be extreme cases such as the hotel was closed for construction, but irrespective of the real reason, a lack of correlation across sites is a significant indicator for spotting misbehavior.

Figure 9:
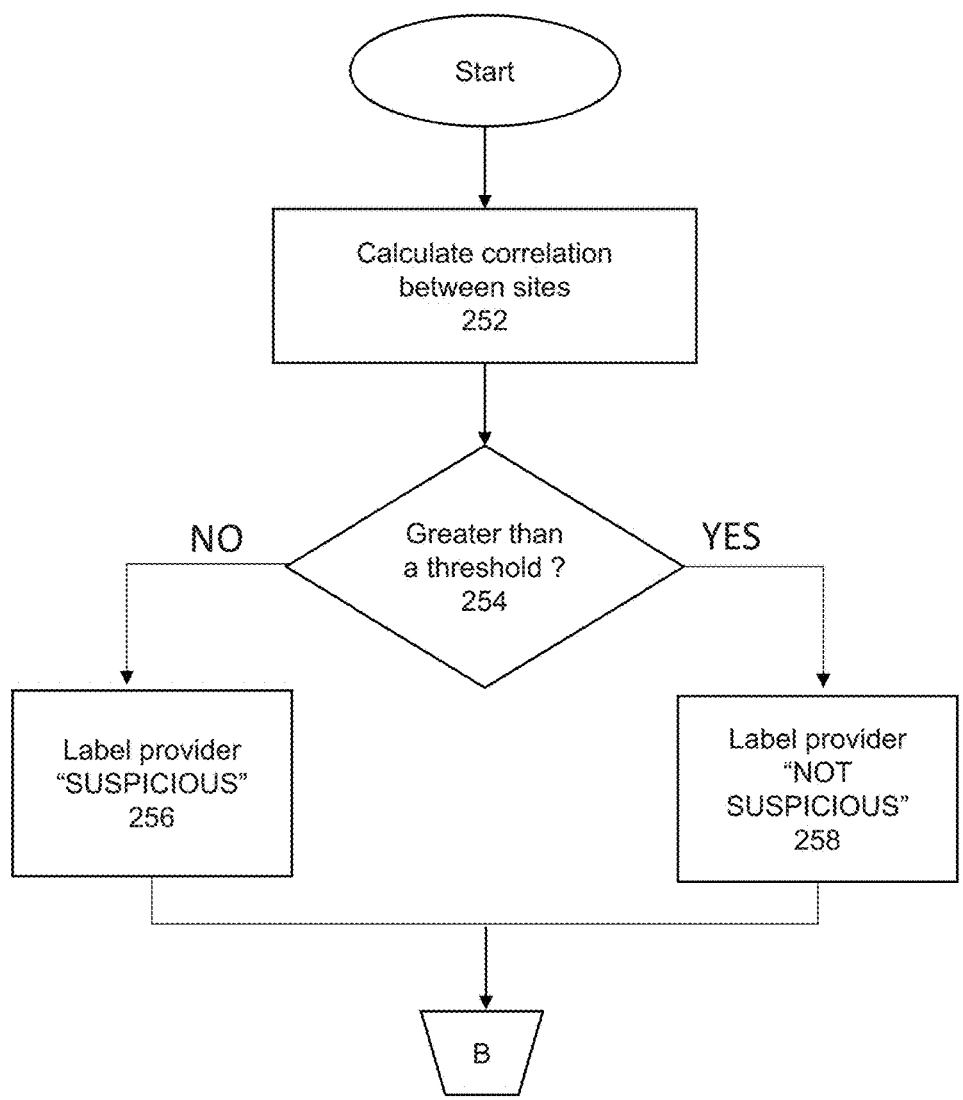
FIG. 9 is a flow chart directed to steps to identify other temporal inconsistent characteristics of provider-centric features.

As shown in FIG. 9, the Pearson's correlation coefficient between the time series of number of ratings per day from two sites is calculated at step 252. Using only overlapping time duration for calculation, if the overlap is too small and the sites are not highly correlated falling below a threshold at step 254, the behavior of the provider is not consistent across sites and the provider is labeled as "suspicious" as shown at step 256. If this value is greater than the threshold at step 254, the behavior of the provider is deemed consistent across sites and the provider is labeled as "not suspicious" as shown at step 258.

Adhering to the suggestion that the shape of rating distribution has a strong tie to the spamming behavior, it is found that a "J" shaped distribution has a large number of 5-star and 1-star ratings but a small number of 4-, 3-, and 2-star ratings. This distribution may occur if users review only when they are extremely happy or disappointed. However, it is suspicious to have nearly equal numbers of people who hated and loved a hotel. This suggests that one of those rating groups has been artificially inflated by spam reviews.

Figure 10:
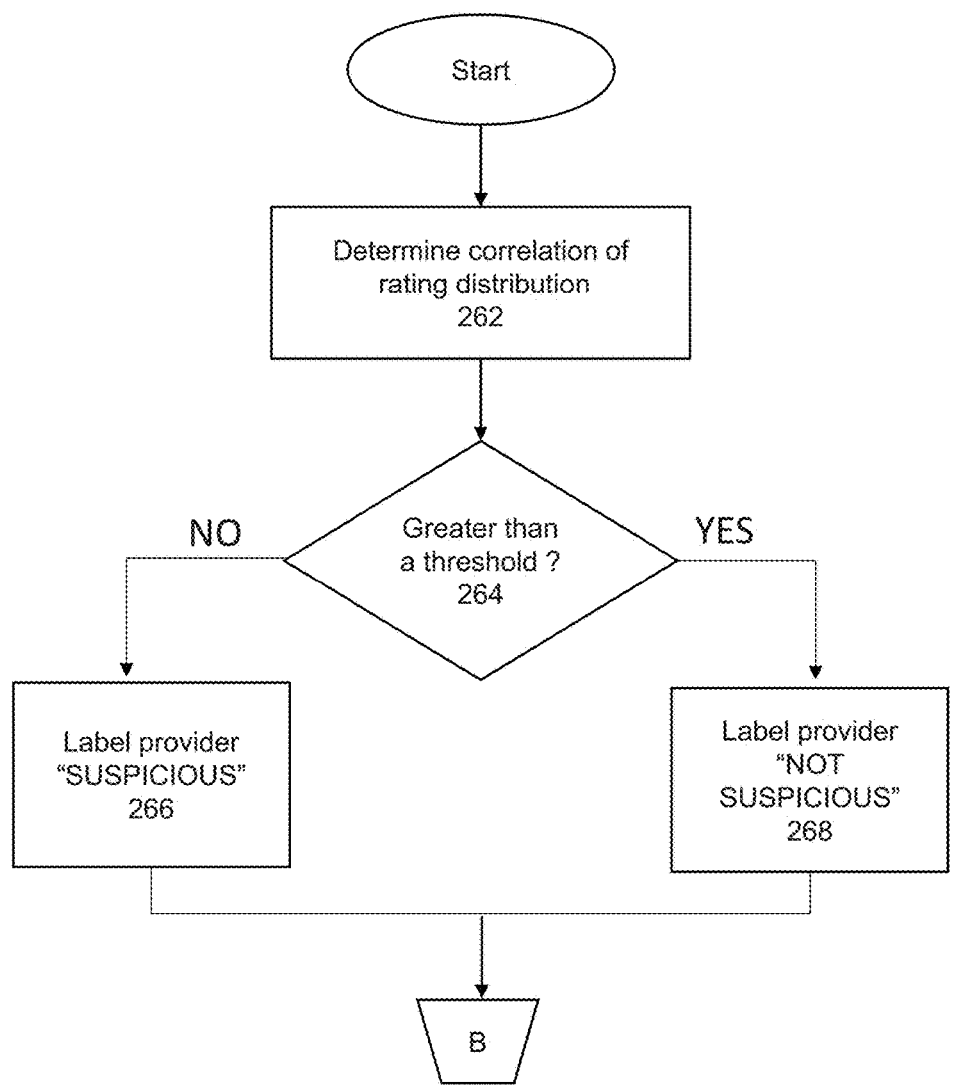
FIG. 10 is a flow chart directed to steps to identify graphical inconsistent characteristics of provider-centric features.

Multiple sites are used to validate the consistency of distributions across sites for individual hotels. As shown in FIG. 10, the Pearson's correlation coefficient between the rating distributions of a hotel across different sites is determined at step 262. The ratings are represented by two vectors of counts of integer ratings. It should be noted that certain embodiments of the invention compare the distributions of the ratings by using the one-sided p-value from the Mann Whitney U Test as a feature. If the correlation with respect to frequency across sites is small such that the sites are not highly correlated falling below a threshold at step 264, the behavior of the provider is not consistent across sites and the provider is labeled as "suspicious" as shown at step 266. If this value is greater than the threshold at step 264, the behavior of the provider is consistent across sites and the provider is labeled as "not suspicious" as shown at step 268.

According to one exemplary embodiment of the invention, correlation coefficients of the distributions between multiple sites are viewed with respect to a threshold of −0.9. All the hotels that show less than −0.9 correlation are located. An interesting co-location pattern for negatively correlated hotels is found around Atlanta, Ga. which is more densely populated with such hotels than any major urban area or popular vacation spot, such as Las Vegas, Nev. or Los Angeles, Calif. Around 5% of the hotels in Georgia show negative correlation, which is much greater than that (1%) in California and Nevada.

Review-centric features are based on the texts of the reviews and their titles. The invention foregoes reliance on any natural language processing techniques to spot a spam review by only text, and instead focuses on contextual characteristics including structural properties of reviews.

Reviewers often write empty reviews with no title and no comment. The incentive for such reviews is that they can be submitted without typing. In addition to these reviews being potentially suspicious, hosting sites treat these reviews differently. For example, empty reviews may be visible at certain times, but hidden other times. However, even when hidden, the empty reviews are counted in overall review tallies. As an example, Excalibur Hotel and Casino in Las Vegas, Nev. has 2500 empty reviews out of 13,144 reviews on a hosting site, but none of are visible through the hosting site. Such behavior of hiding consumer reviews is an omission not fair to consumers. There also may exist some hotels that have a significantly greater proportion of empty reviews than average.

Figure 11:
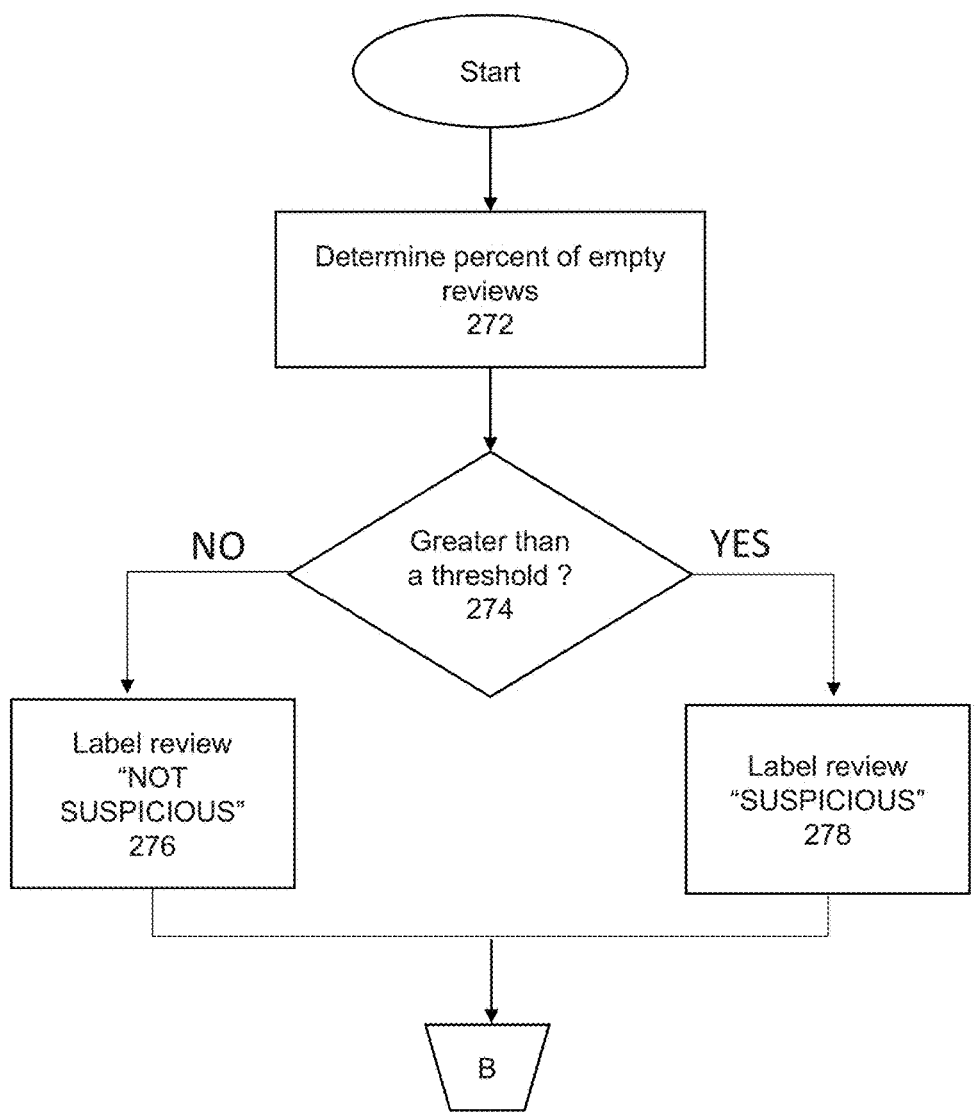
FIG. 11 is a flow chart directed to steps to identify contextual inconsistent characteristics of review-centric features.

FIG. 11 is a flow chart directed to steps to identify contextual inconsistent characteristics specifically directed to empty reviews. At step 272, the percentage value of empty reviews is determined by dividing the number of empty reviews by all reviews for a particular provider. If this percentage value is less than a threshold as shown at step 274 that review is marked as "not suspicious" as shown at step 276. If this value is greater than the threshold at step 274, the review is labeled as "suspicious" at step 278.

Figure 12:
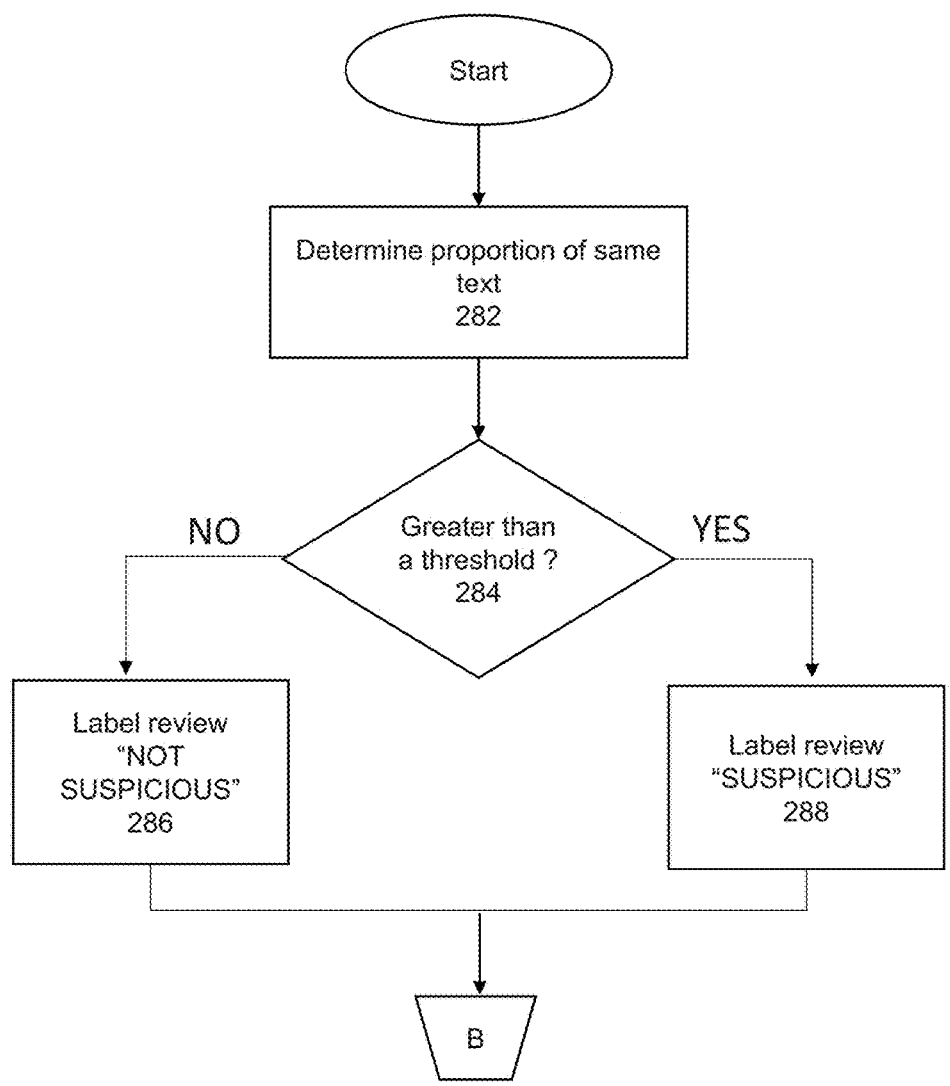
FIG. 12 is a flow chart directed to steps to identify contextual inconsistent characteristics of review-centric features.

While repeating the occasional phrase is to be expected, having reviews that share the majority of the sentences, or are completely identical, is not. FIG. 12 is another flow chart directed to steps to identify contextual inconsistent characteristics of review-centric features directed to identifying identical or same text. At step 282, sentences shared by of any pair of reviews from the same reviewer are divided by the total number of reviews the reviewer made to determine a proportion. Specifically, all reviews made by a given user are compared pairwise and the number of sentences these reviews share are counted, which is divided by the total number of reviews a reviewer wrote. If this value is less than a threshold as shown at step 284 that review is marked as "not suspicious" as shown at step 286. If this value is greater than the threshold at step 284, the review is labeled as "suspicious" at step 288. The values are aggregated to characterize the lack of uniqueness of the provider review set. A provider with many review containing the same sentences repeatedly suggests that the provider is soliciting spam reviews.

Single-site features are generated according to that described above for each hotel in each hosting site. In addition to these single-site features, cross-site features are determined for the provider that exists in multiple sites. These cross-site features are a combination of similar single-site features from many sites. Cross-site features can identify discrepancies that a provider has between a pair of sites, for example, a difference in the percentages of empty reviews.

The single-site features are combined to obtain cross-site features in three different ways: (1) using relative frequencies when taking a ratio of scalar values such as number of reviews, (2) taking correlation coefficients for sequences, such as numbers of high to low ratings, and (3) taking the p-value of the Mann-Whitney U test for distributions, such as the distributions of review lengths in words. The features are normalized to make them reasonably close to standard normal distribution with the intention of treating each feature as independent and identically distributed. It should be noted that some of the features require a log transformation to be converted to standard normal due to exponential fall out, for example, counts of rating scores, counts of empty reviews, and text similarity scores. After log transformations, each feature is normalized by a Z-score.

Figure 13:
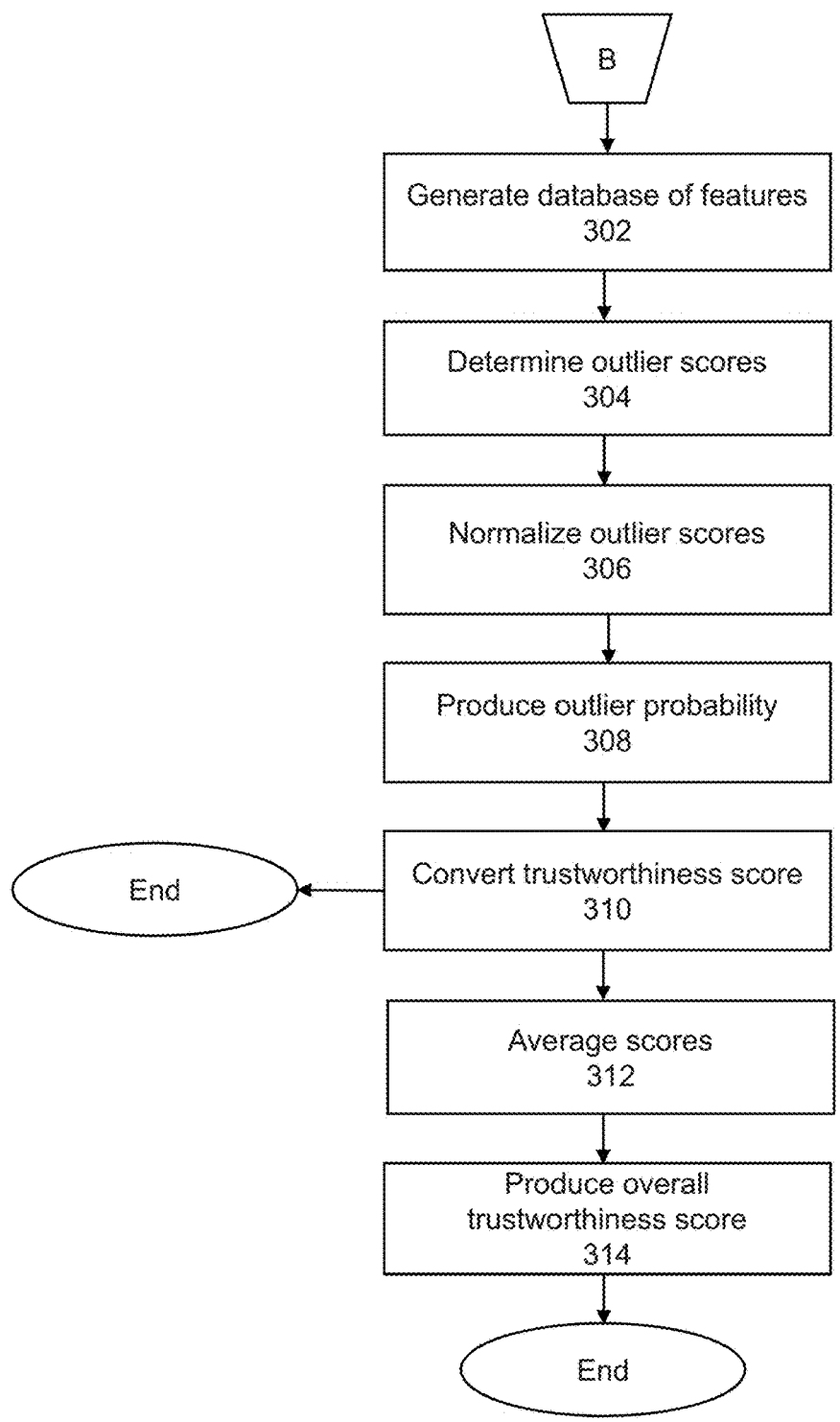
FIG. 13 is a flow chart directed to steps for calculating a trustworthiness score from the reviewer-centric, provider-centric, and review-centric features.

FIG. 13 is a flow chart directed to steps for calculating a trustworthiness score from the reviewer-centric, provider-centric, and review-centric features. Culminating all hosting site and provider features obtained according to that described above, a database is generated at step 302. As shown at step 304, once all the features are available in the database, three approaches are used to rank the hotels with outlier scores: (1) global density-based approach, (2) a local outlier factor approach, and (3) a hierarchical cluster-based approach.

The global density-based approach is applied to compute an outlier score reflecting how different a provider is from the centroid of providers in the feature space. The mode of each feature is taken and a hypothetical provider is formed which lies in the center of a large "normal" cluster. With respect to a hotel provider, it is assumed that most hotels are playing fair and only a small fraction of hotels are generating fake and untruthful reviews. If a hotel is largely dissimilar to the mode/centroid hotel, the hotel might disagree in many features with the mode, which makes its reviews less trustworthy.

The concept of density connectedness is used to form a large cluster of points (i.e. hotels) carrying the mode. A point is a core point if it has k or more points within distance in the Euclidean space. Two points are density-connected if there is a sequence of core points from one to another where every point is within ∈-neighborhood of the previous point. Thus, any point that is not in the core cluster is an outlier and the degree of outlying is proportional to the distance from the nearest core point.

The global density-based approach has a unique advantage in that the core cluster can be of any shape and based on the two parameters (i.e. ∈ and k) to control the size of the core cluster and thus, the size of the outlying cluster. The global density-based approach assumes that all normal hotels form a core cluster. However, there can be alternative structures with numerous small clusters of normal hotels with varying densities in the feature space.

The local outlier factor approach is applied to score outliers by averaging ratios of distances to one or more points and to each of its nearest neighbors. Local outlier factor uses the notion of k-distance ($dist_k(x)$) which is defined as the distance to the k-th nearest neighbor of a point. Local reachability distance ($lrd_k$) of x is the average of the reachability distances from x's neighbors to x. Here $N_k(x)$ is the set of k-nearest neighbors of x.

$$lrd_k(x) = \frac{\|N_k(x)\|}{\sum_{y \in N_k(x)} \max(dist_k(y), dist(x, y))}$$

The local outlier factor of a point x is the average of the ratios of the local reachability of x and its k-nearest neighbors. In addition, the local outlier factor can capture several normal clusters of arbitrary densities that make it robust for any data domain. Formally, the local outlier factor ("LOF") is defined as:

$$LOF_k(x) = \frac{\sum_{y \in N_k(x)} \frac{lrd_k(y)}{lrd_k(x)}}{\|N_k(x)\|}$$

The hierarchical cluster-based approach computes an outlier score by identifying one or more points outside the cluster at a certain level of the hierarchy. The hierarchical cluster-based approach is applied to cluster the data hierarchically using the single linkage method. The single linkage method starts with singleton clusters. The method evaluates pairs of clusters based on the minimum distance between any pair of points that form the two clusters and merges the closest two clusters at every step. This simple bottom-up strategy can produce a dendrogram—a tree structure diagram—over the points without any input parameters.

Once the complete hierarchy is built, a set of clusters is obtained by cutting the hierarchy at a cutoff level. Here again, it is assumed there is a global normal cluster that contains most hotels and any hotel not in this cluster is an outlier. Under this assumption, the cutoff level can be tuned to get a certain percentage of points in the set of outliers.

The three above approaches produce three different outlier scores. However, they are not at the same scale. Therefore, before combining individual scores, they are normalized at step 306 to conform to the same scale. The outlier scores from each of the above approaches are normalized using logarithmic inversion and gaussian scaling.

Let a hotel be x and the outlier score of x is S(x). A log transform is performed:

$$z = \frac{-\log S(x)}{S_{max}}$$

for each hotel x and scale it using a gaussian distribution to produce a probability P(x) value of the hotel x being an outlier at step 308. Such a probability value is useful because it is bounded within [0,1] and can easily be converted to a trustworthiness score by a simple linear inversion with p representing mean, and a representing standard deviation.

$$P(x) = \max\left(0, \operatorname{erf}\left(\frac{z - \mu_z}{\sqrt{2}\, \sigma_z}\right)\right)$$

$$TV(x) = 1 - P(x)$$

TV(x) is the trustworthiness score as shown by step 310. The trustworthiness score describes the probability of a provider's reviews being truthful and is unitless. As described above, trustworthiness scores can be produced from any feature set of the providers (i.e., hotels). Two alternative scores that can be created as well as the overall trustworthiness score. First, TV(1) is produced only using features from one site. Second, TV(2) is produced using an union of features from all sites. Third, the trustworthiness score is produced using the union of all single-site features and the cross-site features from all three sites.

Each outlier detection approach produces its own scores as shown by step 310, however, all scores can be averages as shown by step 312 to calculate an overall trustworthiness score as shown at step 314. The trustworthiness score including overall trustworthiness score successfully identifies outliers.

In the particular embodiment described above in reference to hotel providers, it should be noted that the score of a hotel can change if other hotels connect it to the core cluster and there can be hotels which are unusually good labeled as untrustworthy. These cases are pathological and become rare with more reviews per hotel.

The three approaches used for outlier detection have a set of parameters to tune. Based on the values of these parameters, there are different sized sets of outliers. The sensitivities of these parameters are tested.

Figure 14A:
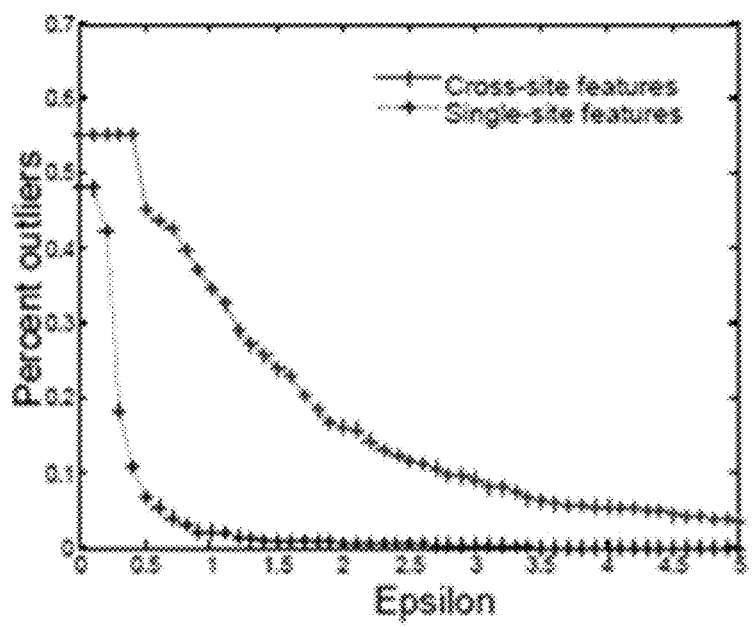
FIG. 14A is a graph illustrating the percentage of outliers detected.
Figure 14B:
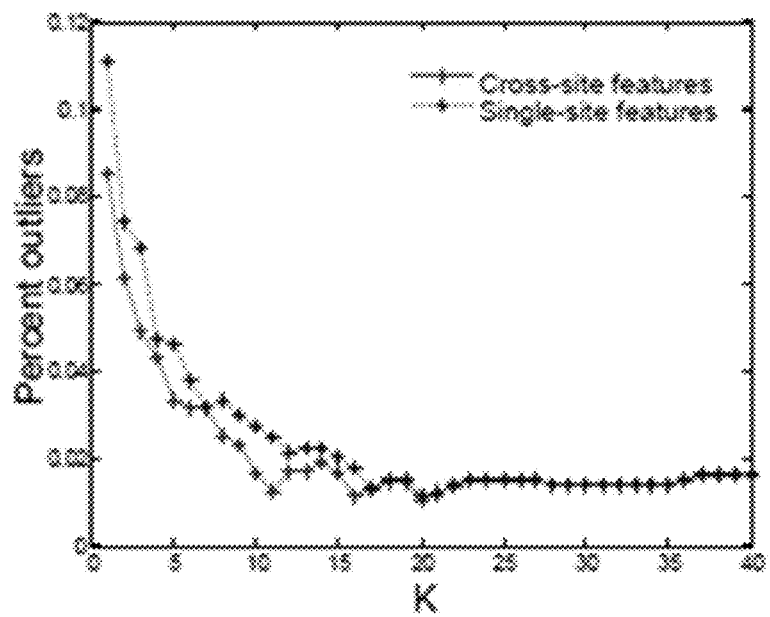
FIG. 14B is another graph illustrating the percentage of outliers detected.

In the global density-based method, ∈ and k are the parameters. The probability of the dataset labeled as outlier is recorded with k=10 and ∈ is varied. In the local outlier factor method, the neighborhood size k is the parameter. In the hierarchical method, the cutoff value is the parameter and the probability of the dataset labeled as outlier is recorded. FIG. 14A is a graph illustrating the percentage of outliers detected in the identity-based approach as ∈ is varied. FIG. 14B is a graph illustrating the percentage of outliers detected in the local outlier factor approach as neighborhood size k is varied.

Feature importance is evaluated during the calculation of the trustworthiness score using two different and independent approaches to evaluate the features: (1) spectral feature selection and (2) distance from mode.

Figure 15:
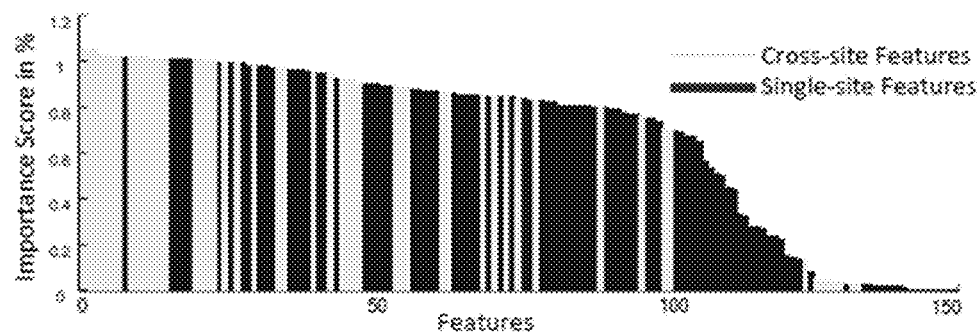
FIG. 15 is a graph illustrating feature importance.

The spectral feature selection method identifies redundancy in feature values and properly demotes dependent features. FIG. 15 is a graph illustrating feature importance. As can be seen, more than 100 features show very uniform importance scores, which supports the validity of the feature set. In addition, the features are categorized into cross-site and single-site classes. The most important features are cross-site features showing the importance of multiple-site data for evaluating hotels.

Figure 16:
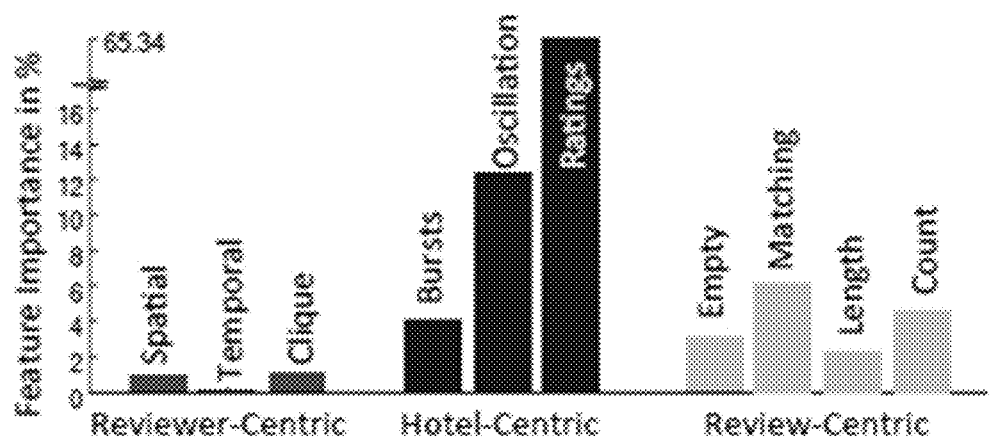
FIG. 16 is a graph illustrating relative importance of reviewer-centric, provider-centric, and review-centric features.

In the distance from mode approach, the outliers produced by the global density-based approach are considered. The most different feature of an outlier with respect to the mode of that feature is selected as the representative for that outlier. A massive shift in importance of our cross-site features is seen, especially the star rating based cross site features that become important for more than half of the outliers. FIG. 16 is a graph illustrating relative importance of reviewer-centric, provider-centric, and review-centric features.

Figure 17:
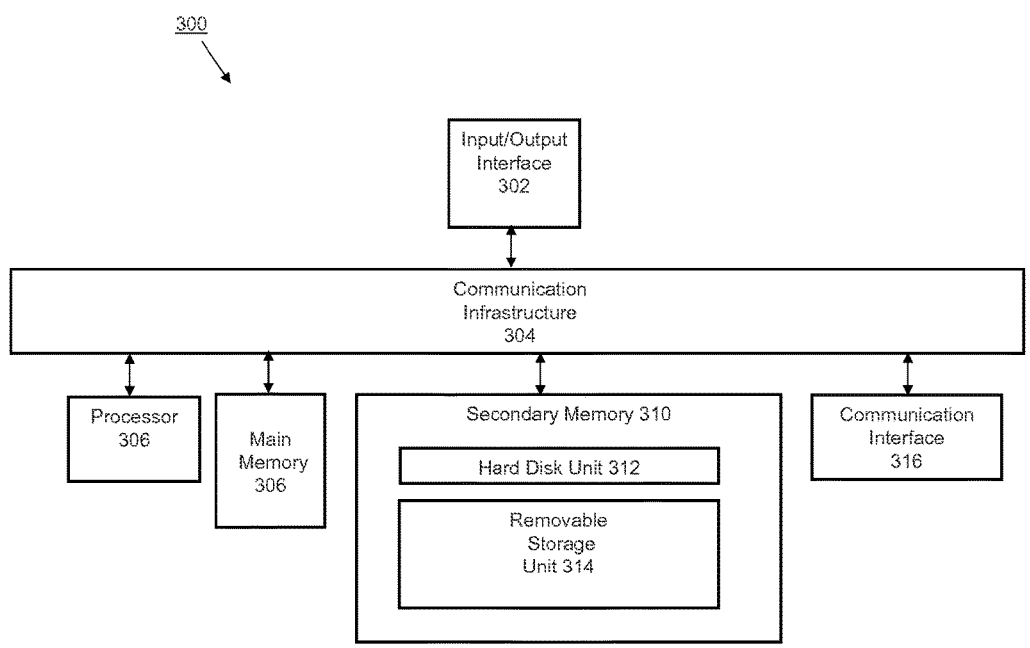
FIG. 17 illustrates an exemplary computer system that may be used to implement the invention.

FIG. 17 illustrates an exemplary computer system 300 that may be used to implement the programs according to the invention.

Computer system 300 includes an input/output display interface 302 connected to communication infrastructure 304—such as a bus —, which forwards data such as graphics, text, and information, from the communication infrastructure 304 or from a frame buffer (not shown) to other components of the computer system 300. The input/output display interface 302 may be, for example, a keyboard, touch screen, joystick, trackball, mouse, monitor, speaker, printer, Google Glass® unit, web camera, any other computer peripheral device, or any combination thereof, capable of entering and/or viewing data.

Computer system 300 includes one or more processors 306, which may be a special purpose or a general-purpose digital signal processor configured to process certain information. Computer system 300 also includes a main memory 308, for example random access memory (RAM), read-only memory (ROM), mass storage device, or any combination thereof. Computer system 300 may also include a secondary memory 310 such as a hard disk unit 312, a removable storage unit 314, or any combination thereof. Computer system 300 may also include a communication interface 316, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 308, secondary memory 310, communication interface 316, or a combination thereof, function as a computer usable storage medium, otherwise referred to as a computer readable storage medium, to store and/or access computer software including computer instructions. For example, computer programs or other instructions may be loaded into the computer system 300 such as through a removable storage device, for example, ZIP disks, magnetic tape, portable flash drive, optical disk such as a CD or DVD or Blu-ray, Micro-Electro-Mechanical Systems (MEMS), nanotechnological apparatus. Specifically, computer software including computer instructions may be transferred from the hard disc unit 312 or removable storage unit 314 to the secondary memory 310 or through the communication infrastructure 304 to the main memory 308 of the computer system 300.

Communication interface 316 allows software, instructions and data to be transferred between the computer system 300 and external devices or external networks. Software, instructions, and/or data transferred by the communication interface 316 are typically in the form of signals that may be electronic, electromagnetic, optical or other signals capable of being sent and received by the communication interface 316. Signals may be sent and received using wire or cable, fiber optics, a phone line, a cellular phone link, a Radio Frequency (RF) link, wireless link, or other communication channels.

Computer programs, when executed, enable the computer system 300, particularly the processor 306, to implement the methods of the invention according to computer software including instructions.

The computer system 300 described herein may perform any one of, or any combination of, the steps of any of the methods presented herein. It is also contemplated that the methods according to the invention may be performed automatically, or may be invoked by some form of manual intervention.

The computer system 300 of FIG. 17 is provided only for purposes of illustration, such that the invention is not limited to this specific embodiment. It is appreciated that a person skilled in the relevant art knows how to program and implement the invention using any computer system.

The computer system 300 may be a handheld device and include any small-sized computer device including, for example, a personal digital assistant (PDA), smart hand-held computing device, cellular telephone, or a laptop or netbook computer, hand held console or MP3 player, tablet, or similar hand held computer device, such as an iPad®, iPad Touch® or iPhone®.

The described embodiments are to be considered in all respects only as illustrative and not restrictive, and the scope of the invention is not limited to the foregoing description. Those of skill in the art may recognize changes, substitutions, adaptations and other modifications that may nonetheless come within the scope of the invention and range of the invention.

The invention claimed is:

1. A method for assessing the trustworthiness of a plurality of reviews directed to a provider, comprising the steps:
   providing a first database of reviews;
   generating a second database including reviewer-centric features involving inconsistent and unlikely reviews by a reviewer, provider-centric features involving inconsistent and unlikely reviews by a provider, and review-centric features involving contextual characteristics of each review, each of the features capturing temporal, spatial, contextual and graphical characteristics from one or more different review hosting sites;
   determining by a processor three outlier scores for the provider based on the features using each of a global density-based approach, a local outlier factor approach, and a hierarchical cluster-based approach;
   normalizing by the processor the three outlier scores to conform to a numerical scale;
   combining by the processor the scaled outlier scores into a combined outlier score;

producing by the processor an outlier probability value using the combined outlier score;
converting by the processor the outlier probability value to a trustworthiness score, a greater trustworthiness score indicating a greater level of suspiciousness of the reviews of the provider; and
outputting by the processor the trustworthiness score.

2. The method according to claim 1, wherein the reviewer-centric features comprise a maximum number of reviews within a particular location, a maximum number of reviews within a particular time period, and a maximum number of reviews in common with each other based on the provider reviewed, dates for each review, and a clique size.

3. The method according to claim 1, wherein the provider-centric features comprise one or more selected from the group of: bursts, temporal bursts, oscillations, correlation of ratings between hosting sites, and correlation within the same hosting site.

4. The method according to claim 1, wherein the review-centric features comprise a count of empty reviews and one or more reviews with a proportion of same text.

5. The method according to claim 1, wherein the global density-based approach computes one of the three outlier scores by locating one or more points outside a core connected cluster.

6. The method according to claim 1, wherein the local outlier factor approach computes one of the three outlier scores by averaging ratios of distances to one or more points and to each of its nearest neighbors.

7. The method according to claim 1, wherein the hierarchical cluster-based approach computes one of the three outlier scores by identifying one or more points outside clusters at a certain level of a hierarchy.

8. The method according to claim 1, wherein the normalizing step is performed using logarithmic inversion and gaussian scaling.

9. The method according to claim 1, wherein the converting step is performed using linear inversion.

10. The method according to claim 1 further comprising the steps of:
comparing by the processor names of one or more providers using a number of letters in common to determine a similarity value;
comparing by the processor a physical location of each of the one or more providers using geocoding to determine a distance value;
determining by the processor a maximum distance value and a minimum similarity value; and
identifying by the processor the one or more providers with the distance value less than the maximum distance value and the similarity value greater than the minimum similarity value.

11. The method according to claim 10, wherein the similarity value is computed according to the step of dividing the number of letters in common by a number of letters of a provider of the one or more providers with the longest name.

12. The method according to claim 10, wherein the distance value is computed according to the steps of:
translating by the processor the physical location into a latitude coordinate and a longitude coordinate;
converting by the processor the latitude coordinate and the longitude coordinate into spherical coordinates in radians;
computing by the processor an arc length from the spherical coordinates in radians;
multiplying by the processor the arc length by a radius of earth in miles; and
providing by the processor a distance value in miles between two provider locations.

13. The method according to claim 5, wherein the global density approach comprises the steps of:
determining by the processor if a point representing a provider is a core point if it has a threshold number of points within a distance in a Euclidean space;
finding by the processor all core points within a predefined neighborhood from one to another to define a core cluster; and
denoting by the processor each point that is not in the core cluster as an outlier.

14. The method according to claim 6, wherein the local outlier factor approach is defined as:

$$LOF_k(x) = \frac{\sum_{y \in N_k(x)} \frac{lrd_k(y)}{lrd_k(x)}}{\|N_k(x)\|}$$

wherein x represents the provider as a point, ($lrd_k$) represents a local reachability distance of x as an average of the reachability distances from x's neighbors to x, and $N_k(x)$ represents a set of k-nearest neighbors of x.

15. The method of claim 14, wherein the local reachability distance of x is defined as:

$$lrd_k(x) = \frac{\|N_k(x)\|}{\sum_{y \in N_k(x)} \max(dist_k(y), dist(x, y))}$$

wherein $dist_k(x)$) represents a distance to the k-th nearest neighbor of x.

16. The method according to claim 7, wherein the hierarchical cluster-based approach comprises the steps of:
evaluating by the processor two clusters based on a minimum distance between any pair of points that form the two clusters; and
merging by the processor the closest two clusters.

17. The method according to claim 8, further comprising the step of performing by the processor a log transform defined as:

$$z = \frac{-\log S(x)}{S_{max}}$$

wherein x represents the provider and S(x) is the scaled outlier score.

18. The method according to claim 1, wherein the probability outlier value P(x) is defined as:

$$P(x) = \max\left(0, \operatorname{erf}\left(\frac{z - \mu_z}{\sqrt{2}\,\sigma_z}\right)\right)$$

wherein z represents a log transform of a provider x with a scaled outlier score S(x), μ represents mean, and σ represents standard deviation.

19. The method according to claim 1, wherein the trustworthiness score TV(x) is defined as:

$$TV(x)=1-P(x)$$

wherein P(x) is the probability outlier value.

20. A method for assessing the trustworthiness of a plurality of reviews directed to a provider, comprising the steps:
- providing a first database of reviews;
- generating a second database comprising reviewer-centric features involving inconsistent and unlikely reviews by a reviewer, provider-centric features involving inconsistent and unlikely reviews by a provider, and review-centric features involving contextual characteristics of each review, each of the features capturing temporal, spatial, contextual and graphical characteristics from one or more different review hosting sites;
- using by a processor the reviewer-centric features, the provider-centric features, and the review-centric features to determine outlier scores from each of a global density-based approach, a local outlier factor approach, and a hierarchical cluster-based approach;
- normalizing by the processor the outlier scores to conform to a numerical scale;
- combining by the processor the scaled outlier scores into a combined outlier score;
- producing by the processor an outlier probability value using the combined outlier score, wherein the probability outlier value P(x) is defined as:

$$P(x) = \max\left(0, \mathrm{erf}\left(\frac{z-\mu_z}{\sqrt{2}\,\sigma_z}\right)\right)$$

wherein z represents a log transform of a provider x with the combined outlier score S(x), μ represents mean, and σ represents standard deviation;
- converting by the processor the outlier probability value to a trustworthiness score using linear inversion, wherein the trustworthiness score TV(x) is defined as:

$$TV(x)=1-P(x);\ \mathrm{and}$$

- outputting by the processor the trustworthiness score, wherein a greater trustworthiness score indicates a greater level of suspiciousness of the reviews of the provider.

* * * * *